May 27, 1969

E. E. McCULLOUGH ET AL 3,446,437

ROCKET NOZZLE SUPPORT AND PIVOTING SYSTEM

Filed May 5, 1967

INVENTORS.
EDWARD E. McCULLOUGH
BY EDWARD G. DORSEY, JR.

*Edward E. McCullough*

AGENT

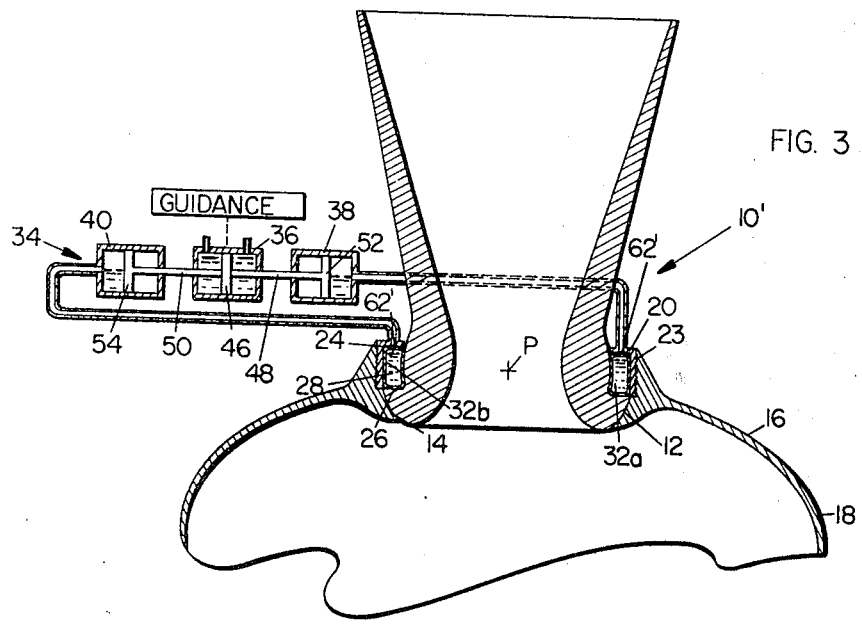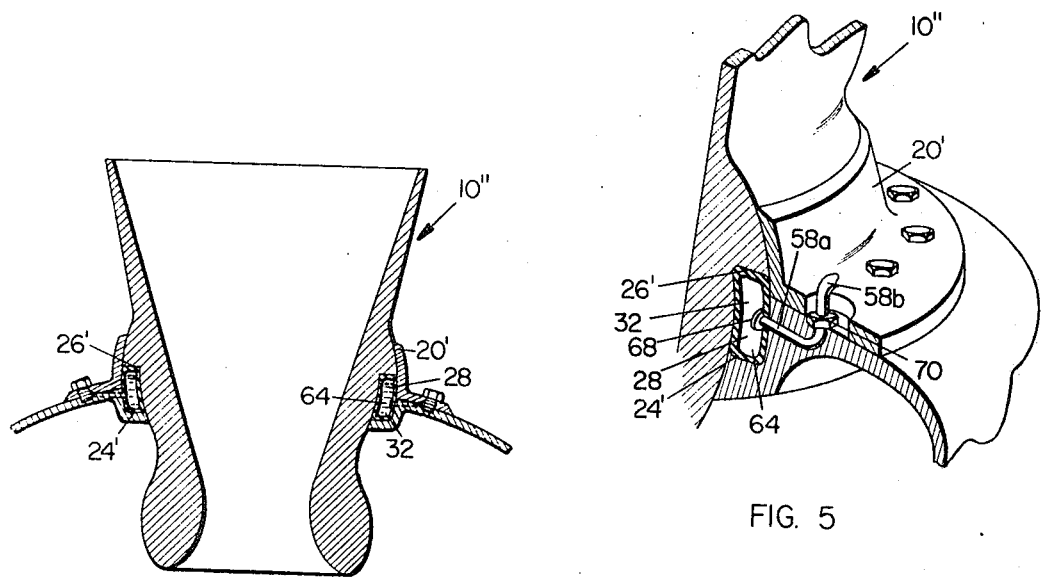

United States Patent Office 3,446,437
Patented May 27, 1969

3,446,437
ROCKET NOZZLE SUPPORT AND PIVOTING SYSTEM
Edward E. McCullough and Edward G. Dorsey, Jr., Brigham City, Utah, assignors to Thiokol Chemical Corporation, Bristol, Pa., a corporation of Delaware
Filed May 5, 1967, Ser. No. 636,402
Int. Cl. B64c 15/04; B64b 1/36; F02k 1/24
U.S. Cl. 239—265.35                                 4 Claims

ABSTRACT OF THE DISCLOSURE

A system for rockets wherein the thrust nozzle is mounted to the aft closure of the rocket motor by an annular, hollow seal partitioned into cells and interposed between the nozzle and aft closure. The thrust nozzle may be pivoted for thrust vector control by selective inflation and deflation of the cells.

---

This invention relates to movable thrust nozzles for rocket motors; and, more particularly, it relates to apparatus for sealed mounting and actuation of such nozzles.

Many of the arrangements heretofore employed for mounting a thrust nozzle on a rocket motor casing, and for moving the nozzle, have been complex and heavy. Generally the mounting means and the means for moving the nozzle have been separate mechanisms. For example, a nozzle may be supported by a bearing or gimbal rings and moved by hydraulic cylinders attached to the nozzle and to fixed points on the rocket motor.

According to the present invention a nozzle is mounted on a resilient, annular seal which serves the dual purpose of providing support for the nozzle and actuation means for moving it. The seal is partitioned into cells that are selectively inflated and deflated to move the nozzle in desired directions. Either gases or liquids can be used as the pressurizing fluid. Because the force for moving the nozzle is provided by fluid pressure rather than through mechanical linkages, the invention provides a lightweight, reliable, and simply-constructed system for thrust vector control of a rocket. These are the primary objects of the invention.

Other objects and advantages of the invention will become apparent as the following description is read with reference to the accompanying drawings, wherein the same parts are designated with identical characters throughout the description and views.

In the drawings:

FIGURE 3 is a diagram and partial section of the aft-end portion of a rocket to illustrate clearly the actuation principle of the embodiment of FIGURE 1, as applied to a nonsubmerged nozzle;

FIGURE 4 is a sectional view of the aft-end portion of a rocket incorporating an alternate embodiment of the invention, and FIGURE 5 is a fragmentary perspective view showing construction details of the embodiment of FIGURE 4.

Figure 1:
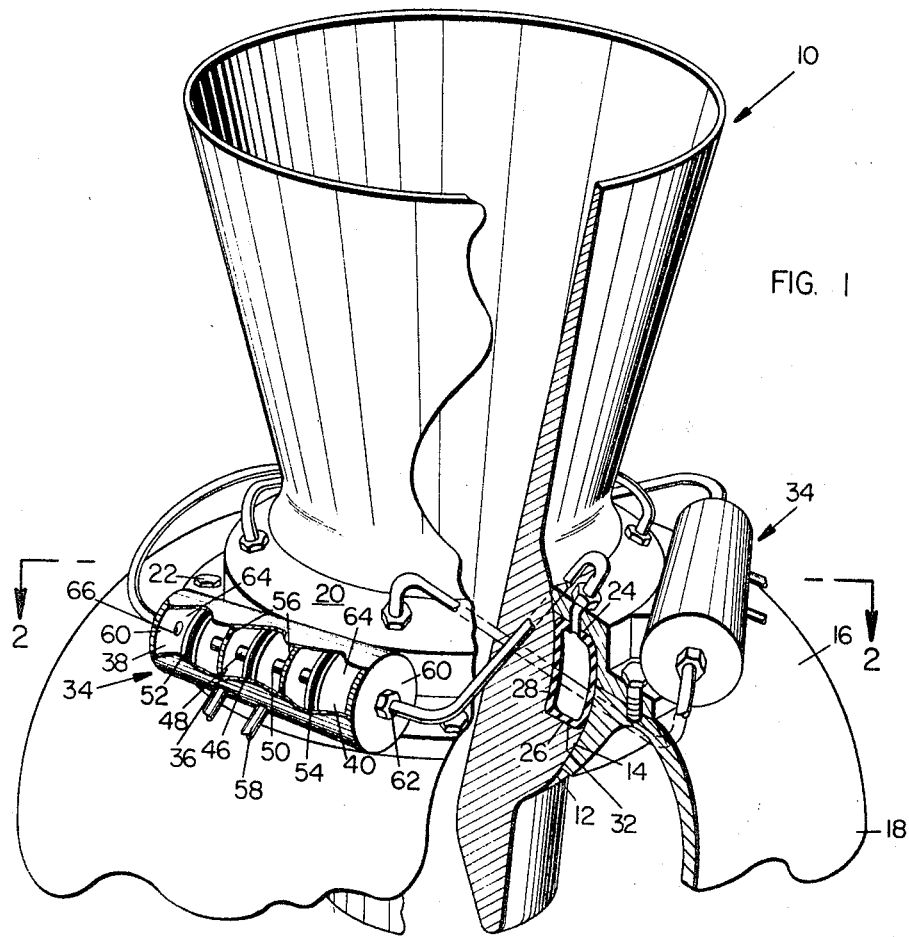
FIGURE 1 is a perspective view of the aft-end portion of a rocket incorporating a preferred embodiment of the invention with some parts broken away to show internal structure.
Figure 2:
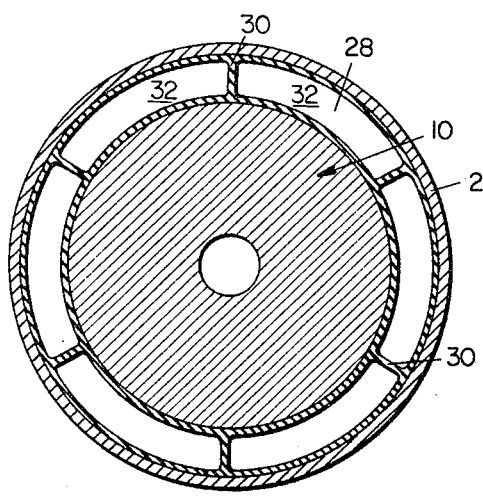
FIGURE 2 is a cross section taken on the line 2—2 of FIGURE 1.

As illustrated in FIGURES 1 and 2, a preferred embodiment of the invention comprises a thrust nozzle, generally designated by the number 10, formed with a convex, spherical surface 12 shaped to fit a concave surface 14 formed in an aft closure 16 of a rocket motor casing 18. Surfaces 12 and 14 are concentric about a point P on the longitudinal axis of the rocket motor, and in combination function as a ball-and-socket joint about which the thrust nozzle 10 can pivot.

A retaining ring 20 is mounted on aft closure 16 contiguous the surface 14. Although in FIGURE 1 the retaining ring is illustrated as being secured to the aft end closure 16 by means of screws 22, it is obvious that other means, such as the threads 23 shown in FIGURE 3, may be used for this purpose. A stationary, annular, bearing member 24 is formed by the aft portion of the retaining ring 20. The thrust nozzle 10 is formed with a movable annular bearing member 26 spaced and shaped complementary to the stationary bearing member 24. A toroidal seal 28 is seated between bearing members 24 and 26. As best seen in FIGURE 2, partitions 30 divide the seal 28 into six cells 32. The number of cells 32 may be varied for specific applications. The radially extending exterior surfaces of the seal 28 are bonded respectively to the stationary, annular, bearing member 24 and the movable, annular bearing member 26. Although the seal 28 may be made of elastic material such as a high-temperature rubber, the partitions 30 must be relatively inelastic to prevent stretching thereof to equalize pressures of adjacent cells 32. This is accomplished by reinforcing the partitions 30 with fibrous material or wires.

The pressure means 34 consists essentially of a primary, double-acting, fluid-operated cylinder 36 that actuates two secondary cylinders 38 and 40 to control the relative inflation of members of diametrically opposite pairs of cells 32, such as the cells 32a and 32b (see FIGURE 3). A driving piston 46 in the primary cylinder 36 is connected by actuation rods 48 and 50 to driven pistons 52 and 54 in the secondary cylinders 38 and 40. The actuation rods 48 and 50 pass through the partitions 56 in sealed relationship therewith, the partitions 56 serving as closures both for the ends of the primary cylinder 36 and for one end each of the secondary cylinders 38 and 40. The closure 60 of each secondary cylinder opposite a partition 56 has an orifice 62 in communication with a cell 32; and the space in each secondary cylinder between the driven piston 52 or 54 and its corresponding orifice 62 is filled with the same working fluid 64 that fills the cells 32. Hence, as hydraulic fluid, introduced through tubes 58, moves the driving piston 46 along the axis of the primary cylinder 36, the driven pistons 52 and 54 are moved through the same distance within their respective secondary cylinders 38 and 40 to cause one of the cells 32 to expand while the diametrically opposite cell 32 is caused to contract by the same amount. For example, if the driving piston 46 of FIGURE 3 is moved to the right, the driven piston 52 will cause the cell 32a to expand and the driven piston 54 will extract fluid from the cell 32b causing it to contract. Since these cells are restricted from expanding in lateral directions, it may be seen that the nozzle 10 will be rotated in a counterclockwise direction about the center point P.

It may be noted that, as the number of cells 32 is increased in a given rocket motor, the difference in pressure between adjacent cells, and hence the strain on the partitions 30 during rotation of the nozzle, becomes smaller. This may be an important design consideration in some applications of the invention.

As is well-known in the art, conditions, such as combustion-chamber pressure and the relative nozzle surface areas upstream and downstream of the throat orifice thereof, can combine to determine whether the predominant load on a thrust nozzle will tend to force it inwardly or outwardly relative to the rocket motor. In the present invention, this predominant load on the nozzle 10 determines whether the fixed bearing surface 24 should be positioned forward or aft of the seal 28. The embodiment of the invention shown in FIGURES 1, 2, and 3, designed for a blowout load, has the stationary bearing member 24 positioned aft of the seal 28 to provide positive support therefor.

FIGURES 4 and 5 illustrate an alternate embodiment of the invention designed for a blow-in load. Hence, the stationary annular bearing member 24' is forward of the toroidal seal 28, and it is not a part of the retaining means 20' as in the previous embodiment. In all respects construction and operation of this embodiment are otherwise identical to those of FIGURES 1 and 2. FIGURE 5 shows structural details of how the working fluid 64 is communicated from the pressure means, not shown, to a cell 32. A radial flange 68 on the end of a tube 58a, passing through a sidewall of the seal 28, is sealed to the inside thereof. A coupling 70 attaches the tube 58a from the seal 28 to a second tube 58b to the pressure means.

Although the embodiments of the invention have been described with considerable specificity regarding detail, it should be noted that it is possible to alter many such details without departing from the scope of the invention as defined in the following claims.

What is claimed is:

1. In a rocket motor, a thrust nozzle support and pivoting system for mounting a thrust nozzle to a rocket case having an aft closure with an opening therein, comprising:
   a stationary, annular, bearing member fixed to said aft closure and concentric with said opening thereof;
   a movable, annular, bearing member surrounding said nozzle and fixed thereto;
   a flexible, hollow, toroidal seal positioned between said bearing members, divided by partitions into cells, and bonded on one radially-extending surface thereof to said stationary bearing member and on the other to said movable bearing member;
   retaining means fixed to said aft closure for retaining said nozzle in said opening; and
   pressure means operatively connected to each of said cells for rotating said nozzle about an axis perpendicular to that of said rocket by selective pressurization of said cells.

2. The thrust nozzle support and pivoting system of claim 1 wherein said stationary bearing member is positioned forward of said seal.

3. The thrust nozzle support and pivoting system of claim 1 wherein said stationary bearing member is positioned aft of said seal.

4. The thrust nozzle support and pivoting system of claim 1 wherein said pressure means comprises:
   a primary, closed, double-acting, fluid-operated cylinder having a driving piston therein and a pair of actuation rods, one fixed to each side of said piston and extending through each end closure of said cylinder; and
   a pair of hollow, closed, secondary cylinders, one adjacent each end of said primary cylinder and having a driven piston therein attached to one of said actuation rods, each of said rods extending through one end closure of a secondary cylinder, the opposite end closure of each cylinder having an orifice in communication with one of a pair of diametrically opposite said cells, so that a working fluid for pressurizing said cells also fills the space in each of said secondary cylinders between said driven piston and said orifice, whereby motion of said driven pistons will cause one of said pair of cells to expand and the other to contract by the same volume to provide actuation means for pivoting said thrust nozzle.

References Cited

UNITED STATES PATENTS

| 3,098,625 | 7/1963 | Thielman | 244—4 |
| 3,243,124 | 3/1966 | Lee | 239—127.1 |
| 3,251,553 | 5/1966 | Fitton et al. | 239—127.3 |

EVERETT W. KIRBY, *Primary Examiner.*

U.S. Cl. X.R.

60—232; 244—52